United States Patent [19]

Ramsey

[11] 4,188,003
[45] Feb. 12, 1980

[54] STRAIN RELIEF BUSHING
[75] Inventor: Charles W. Ramsey, Niles, Ohio
[73] Assignee: General Motors Corporation, Detroit, Michigan
[21] Appl. No.: 887,950
[22] Filed: Mar. 20, 1978
[51] Int. Cl.² ............................................. F16L 5/00
[52] U.S. Cl. .............................. 248/56; 174/153 G; 339/103 R; 403/195
[58] Field of Search ......... 248/56; 174/153 G, 152 G, 174/65 G; 339/103 R, 103 B, 103 C, 103 M, 126 RS; 85/80, 81; 151/41.75; 403/194, 195, 239; 16/2

[56] References Cited

U.S. PATENT DOCUMENTS

| | | | |
|---|---|---|---|
| 2,430,809 | 11/1947 | Flora et al. | 248/56 |
| 2,836,215 | 5/1958 | Rapata | 339/126 RS X |
| 3,056,852 | 10/1962 | Sachs | 174/153 G |
| 3,130,822 | 4/1964 | Meyer | 85/81 |
| 3,516,111 | 6/1970 | Heyman | 16/2 |
| 3,562,847 | 2/1971 | Jemison | 248/56 X |
| 3,634,608 | 1/1972 | Buhl et al. | 248/56 X |
| 3,701,302 | 10/1972 | Pestka et al. | 85/80 |
| 3,803,973 | 4/1974 | Rapata | 151/41.75 X |

FOREIGN PATENT DOCUMENTS 275410  1/1966  Australia ...................................... 16/2

Primary Examiner—Rodney H. Bonck

[57] ABSTRACT

The drawing illustrates a strain relief bushing adapted for retaining a pair of wire leads in place in a predetermined rectangular opening formed in a panel wall. The bushing includes retention means located adjacent each side of the panel wall once the bushing is installed, for preventing removal of the bushing therefrom. The installed bushing also includes abutment means for flexing the bushing to tightly grip the wire leads disposed therethrough.

2 Claims, 5 Drawing Figures

STRAIN RELIEF BUSHING

This invention relates generally to strain relief bushings, and, more particularly, to such bushings for use with a pair of wire leads at a point where the leads pass through an opening in a panel wall of an electrical appliance or the like.

In electrical appliances, it is highly desirable that some means be provided for taking the strain exerted by the wire leads if the leads are accidentally pulled in a direction tending to disconnect them from the appliance. One expedient for this purpose, is to merely tie a knot in the wire leads inside the wall of the appliance, with the knot being too large to be pulled outwardly through an opening in the wall. This arrangement, however, has the disadvantage that it may cause the insulation on the wire to wear very rapidly at the location of the knot, and thereby create a dangerous short circuiting condition. To overcome this and other disadvantages of the simple knot arrangement, various, generally satisfactory, types of grommets or bushings have been designed in the past for taking the strain forces exerted by wire leads in a manner decreasing the tendency for damage to the leads or any parts to which it is connected.

A general object of the present invention is to provide an improved strain relief bushing for the above described application.

Another object of the invention is to provide a one-piece strain relief bushing which is adapted to being readily attached to wire leads, and readily mounted in a panel opening, and including improved means for efficiently retaining the associated wire leads in place in the bushing against movement in any direction, and retaining the bushing, in turn, securely in place in the panel opening.

A further, more specific object of the invention is to provide a one-piece, molded plastic strain relief bushing for mounting in a panel opening, the bushing including a central body portion having a longitudinal passage formed therethrough with a transverse opening communicating with the longitudinal passage for mounting the bushing on a pair of wire leads. Flexible hinge members are formed on opposite sides of the body portion, and oppositely disposed transverse levers are formed adjacent one end of the body portion, projecting outwardly therefrom in the transverse direction with respect to the hinge members. Locking means are formed on the outer surfaces of the hinge members for retaining the bushing in place in the panel wall in one direction, while the transverse levers retain the bushing in place in the other direction.ABUTMENT means are formed on the inner surfaces of the hinge members for flexing the body portion during the installation process to decrease the size of the longitudinal passage through the body portion to tightly grip the lead wires disposed therein.

These and other objects and advantages of the invention will be apparent when reference is made to the following description and accompanying drawings, wherein.

Figure 1:
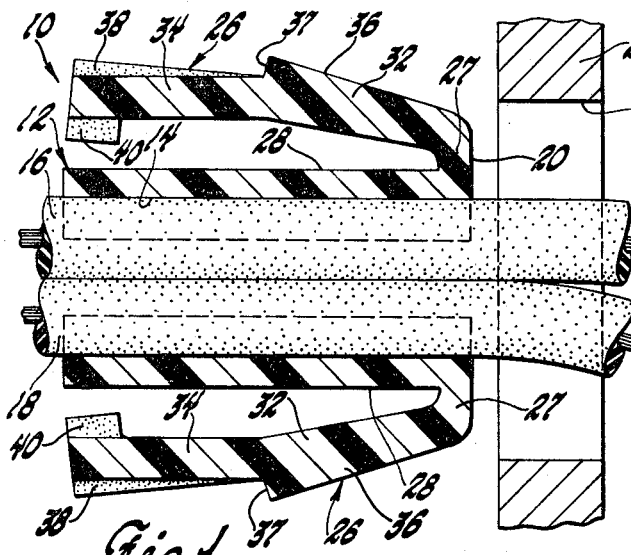
FIG. 1 is a cross-sectional view of a strain relief bushing embodying the invention and mounted around lead wires adjacent a panel opening.
Figure 5:
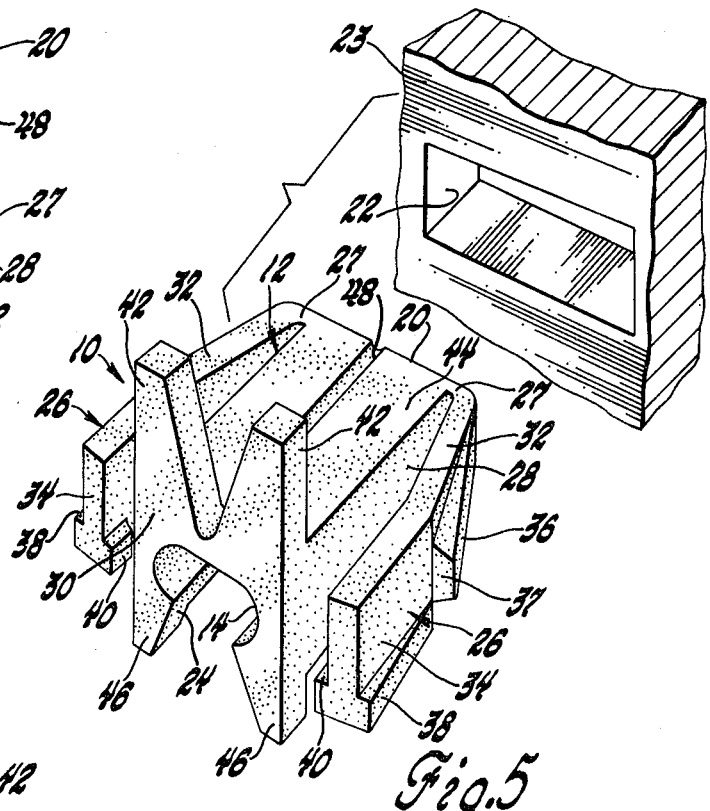
FIG. 5 is a perspective view of the inventive strain relief bushing positioned for insertion in a panel opening.
Figure 4:
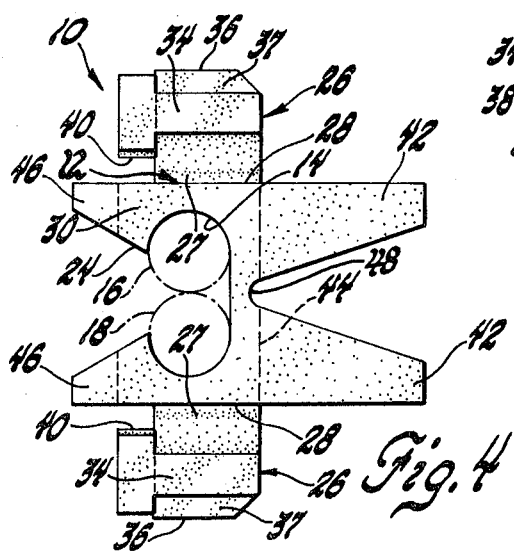
FIG. 4 is an end view taken along the plane of the line 4—4 of FIG. 3, and looking in the direction of the arrows.

Referring now to the drawings in greater detail, FIG. 1 illustrates a one-piece, molded plastic strain relief bushing 10 including a central body portion 12 having a longitudinal passage 14 formed therethrough for mounting around a pair of lead wires 16 and 18, and having one end portion 20 thereof adapted for insertion through a suitable opening 22 formed in a panel wall 23, such as the wall of a housing of an electrical appliance. As may be noted in FIG. 5, the panel opening 22 is formed in a predetermined rectangular shape. As shown in FIGS. 4 and 5, the central body portion 12 is formed in a predetermined rectangular shape and the longitudinal passage 14 therethrough is formed in a predetermined oval shape. A tapered opening 24 is formed in one side of the body portion 12, communicating with the longitudinal passage 14 to accommodate the mounting of the bushing 10 around typical lead wires 16 and 18.

Figure 3:
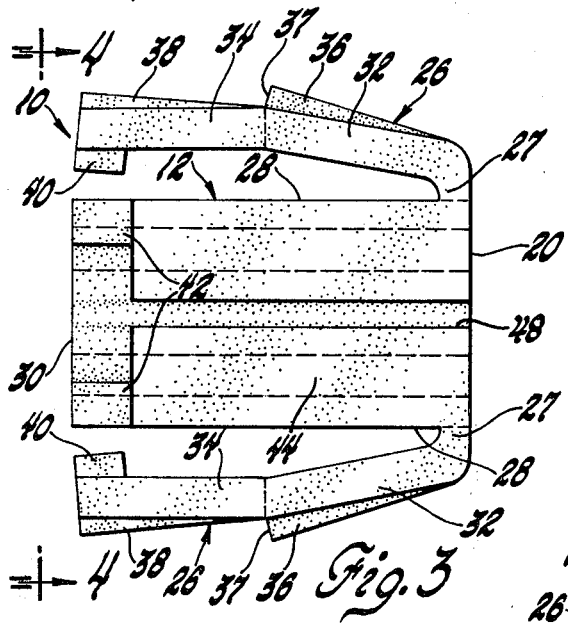
FIG. 3 is a side elevational view of the inventive strain relief bushing in its original free state.

The bushing 10 is further shown in FIGS. 3 and 5 to include a longitudinal lever member 26 secured via a flexible web 27 to each side wall 28 of the central body portion 12 adjacent the end portion 20. The lever members 26 extend generally longitudinally away from the flexible web 27, terminating at the plane of the end face of the other end portion 30.

Each lever member 26 includes a first segment 32 extending substantially half the distance from the end portion 20 toward the end portion 30 at a first free state predetermined angle with respect to the adjacent side wall 28, and a second segment 34 extending across the remaining length of the side wall 28 at a second predetermined angle, the latter being smaller than the first angle. An outwardly tapering portion 36 is formed along the length of the outer surface of each first segment 32, terminating in a locking edge surface 37. An additional outwardly tapering portion 38 is formed along the length of the outer surface of each second segment 34, and an abutment segment 40 is formed on the inner surface of each second segment 34 adjacent the distal end thereof.

A first pair of levers 42 are formed on one side wall 44, between the oppositely disposed side walls 28, adjacent the end 30 of the central body 12, projecting outwardly from the body 12 in one transverse direction. A second pair of levers 46 are formed on the other side wall 44, substantially as extensions of the levers 42 in the other transverse direction. A longitudinal groove 48 is formed along the center of the side wall 44, serving as a longitudinal hinge for the central body portion 12.

At assembly, the bushing 10 is mounted on the pair of wire leads 16 and 18, which have been extended through the rectangular panel opening 22. This is accomplished by urging the transverse tapered opening 24 of the bushing 10 over the wire leads so as to mount the latter in the longitudinal oval passage 14. The end portion 20 of the bushing 10 is then directed toward the panel opening 22 (FIGS. 1 and 5). As the bushing 10 is forced into the opening 22, the oppositely disposed lever members 26 are first urged toward the side walls 28 of the central body portion 12, until the tapered locking portions 36 have passed through the opening, after which the first segment 36 of each lever 26 flexes outwardly until the tapered portions 38 of the second lever segments 34 engage the adjacent walls of the rectangular opening 22.

Figure 2:
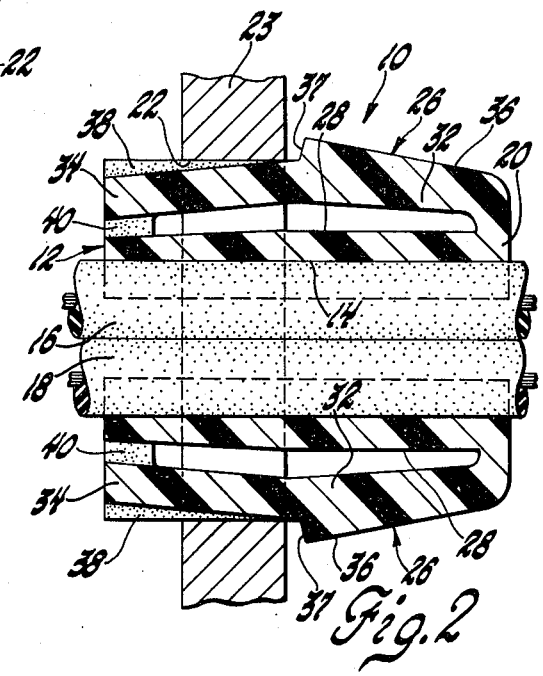
FIG. 2 is a cross-sectional view of the inventive strain relief bushing in its assembled condition around lead wires and in place in a panel opening.

In this position, the locking edge surfaces 37 will prevent the bushing 10 from being pulled back through the opening 22, while the transverse levers 42 and 46 will prevent the bushing 10 from being pushed any further through the opening 22. Throughout the installation operation, as may be noted in FIG. 2, the abutment portions 40 will have been urged into contact with the respective side walls 28 of the central body 12, flexing the latter about the longitudinal hinge 48 to decrease the size of the longitudinal passage 14 and, thereby, tightly gripping the wire leads 16 and 18 disposed in the passage 14, preventing the leads from being drawn in either direction along the longitudinal opening 14.

It should be apparent that the invention provides a one-piece, molded bushing which is readily attached to one or more wire leads, and then readily mounted in a panel opening, and including means for efficiently retaining the wire leads in place in the bushing, and the bushing, in turn, in place in the panel opening, against efforts to pull the leads and the bushing in either direction relative to the panel wall.

While but one embodiment has been shown and described, other modifications thereof are possible.

The embodiments of the invention in which an exclusive property or privilege is claimed are defined as follows:

1. A one-piece molded plastic strain relief bushing of the type for mounting within a panel hole an electrical conductor or the like contained within the bushing, comprising:

a body portion having a longitudinal passage extending therethrough, and a transverse opening of reduced width and in communication with the longitudinal passage for sideways reception of an electrical conductor therein, a pair of longitudinal levers connected to opposite sides of one end of the body portion and each formed to extend toward the other end thereof normally in spaced apart relation with said opposite sides, said levers being movable toward and away from said opposite sides of the body portion about said one end of the latter, said levers having formed thereon abutment means juxtaposed to said other end of said body portion and means which, with an electrical conductor or the like loosely in place in the bushing, are operative upon insertion of the bushing and the conductor into a panel hole to cause movement of said levers toward said opposite sides, to thereby cause said abutment means to engage said opposite sides of said body portion and compress the latter for tight gripping thereby of the electrical conductor disposed in said longitudinal passage.

2. A one-piece molded plastic strain relief bushing of the type for mounting within a panel hole an electrical conductor or the like contained within the bushing, comprising:

a body portion having a longitudinal passage extending therethrough, a longitudinal hinge, and a transverse opening of reduced width formed opposite the hinge and in communication with the longitudinal passage, a pair of longitudinal levers connected to opposite sides of one end of the body portion and each formed to extend toward the other end thereof normally in spaced apart relation with said opposite sides, said levers being movable toward and away from said opposite sides of the body portion, said levers having formed thereon panel engaging portions raised from the outer surface of said levers at the side thereof proximate said transverse opening and abutment portions on the inner surface of the levers juxtaposed to said other end of said body portion proximate said transverse opening, said engaging portions, with an electrical conductor or the like loosely in place in the bushing, being operative upon insertion of the bushing and conductor within a panel hole to cause movement of said levers toward said opposite sides and engage said abutment portions with said opposite sides of said body portion to compress the latter about said hinge for tight gripping of the electrical conductor disposed in said longitudinal passage.

* * * * *